(12) United States Patent
Prasse

(10) Patent No.: US 8,399,548 B2
(45) Date of Patent: Mar. 19, 2013

(54) CROSSLINKABLE MATERIALS BASED ON ORGANOSILICON COMPOUNDS

(75) Inventor: Marko Prasse, Glaubitz (DE)

(73) Assignee: Wacker Chemie AG, Munich (DE)

(*) Notice: Subject to any disclaimer, the term of this patent is extended or adjusted under 35 U.S.C. 154(b) by 412 days.

(21) Appl. No.: 12/558,692

(22) Filed: Sep. 14, 2009

(65) Prior Publication Data

US 2010/0087576 A1 Apr. 8, 2010

(30) Foreign Application Priority Data

Oct. 6, 2008 (DE) .......... 10 2008 042 632

(51) Int. Cl.
C08K 5/20 (2006.01)
C08F 283/06 (2006.01)

(52) U.S. Cl. .......... 524/227; 525/477; 525/474

(58) Field of Classification Search .......... 525/474, 525/477

See application file for complete search history.

(56) References Cited

U.S. PATENT DOCUMENTS

| | | | |
|---|---|---|---|
| 5,358,996 A | 10/1994 | Takago et al. | |
| 5,650,475 A * | 7/1997 | Marutani et al. | 528/26 |
| 7,211,616 B2 | 5/2007 | Kaszubski | |
| 7,470,452 B1 * | 12/2008 | Flosbach et al. | 427/407.1 |
| 7,772,320 B2 * | 8/2010 | Poppe et al. | 524/506 |
| 2003/0088001 A1 | 5/2003 | Maekawa | |
| 2003/0153671 A1 | 8/2003 | Kaszubski et al. | |
| 2004/0087752 A1 | 5/2004 | Schindler et al. | |
| 2004/0126573 A1 * | 7/2004 | Bier et al. | 428/328 |
| 2008/0076883 A1 * | 3/2008 | Takeuchi et al. | 525/477 |
| 2008/0269406 A1 | 10/2008 | Bachon et al. | |
| 2009/0062471 A1 | 3/2009 | Prasse et al. | |
| 2011/0293871 A1 * | 12/2011 | Storfer-Isser | 428/41.8 |

FOREIGN PATENT DOCUMENTS

| | | |
|---|---|---|
| EP | 1 370 602 B1 | 8/2004 |
| EP | 1 873 208 A1 | 1/2008 |
| EP | 2031024 A1 | 3/2009 |
| JP | 63-260965 | 10/1988 |
| JP | 6-49348 | 2/1994 |
| JP | 2005-159585 A | 6/2000 |
| JP | 2000159585 A * | 6/2000 |
| JP | 2000-345136 | 12/2000 |
| JP | 2003-26888 | 1/2003 |
| JP | 2003-327454 | 11/2003 |
| JP | 2009-513806 | 4/2009 |
| WO | 2006003092 A1 | 1/2006 |
| WO | 2008/059873 A1 | 5/2008 |

OTHER PUBLICATIONS

Machine translation of Iida et al (JP 2000159585 A).*
Machine Translation of Iida et al (JP 2000159585). Date: Jun. 13, 2000.*

* cited by examiner

Primary Examiner — Randy Gulakowski
Assistant Examiner — Mike M Dollinger
(74) Attorney, Agent, or Firm — Brooks Kushman P.C.

(57) ABSTRACT

Moisture-curable organosilicon compositions which are storable in the absence of water, and crosslinkable on admission of water at room temperature to give elastomers, are based on organosilicon compositions containing:

(A) compounds of the formula $$A\text{-}[(CR^1{}_2)_b\text{---}SiR_a(OR^2)_{3-a}]_x \qquad (I),$$

(B) an organosilicon compound having basic nitrogen and
(C) compounds of the formula $$R^3\text{---}NH\text{---}C(\!=\!O)\text{---}C(\!=\!O)\text{---}NH\text{---}R^3, \text{ and} \qquad (II)$$

optionally, further additives.

8 Claims, No Drawings

CROSSLINKABLE MATERIALS BASED ON ORGANOSILICON COMPOUNDS

BACKGROUND OF THE INVENTION

1. Field of the Invention

The invention relates to compositions based on organosilicon compounds which are storage stable in the absence of water and crosslink on exposure to water at room temperature to give elastomers and which contain oxaldianilides and silicon compounds containing basic nitrogen, processes for the preparation thereof and moldings produced therefrom.

2. Background Art

One-component sealing compounds storable in the absence of water and which vulcanize on admission of water at room temperature to give elastomers are known. These products are used in large amounts, for example in the construction industry. The basis of these mixtures are polymers which are terminated by silyl groups which carry reactive substituents such as OH groups, or hydrolyzable groups such as alkoxy groups.

Particularly for transparent materials, it is difficult to prepare colorless products simultaneously exhibiting good adhesion to substrates such as plastics or metals. Thus, U.S. Pat. No. B2 7,211,616 and US A1 2003/0153671 describe benzotriazoles as UV absorbers and aminosilanes as an additive. However, such materials easily become discolored and are yellow even after preparation. EP A1 1873208 mentions benzophenols, benzotriazoles, salicylates, substituted tolyl compounds and metal chelates as UV absorbers; preferably, no aminosilanes are added. Such materials have the disadvantage that only insufficient adhesion to plastics and metals is achieved. If an aminosilane is added, discoloration occurs during the storage of the materials.

Oxaldianilides as such have long been known and are used as UV stabilizers in aqueous polyurethane dispersions, aqueous polycarbamide, vinyl polymers such as polyacrylonitrile, polystyrene, polyvinyl acetate, polyvinyl chloride or polyvinyl methacrylate.

SUMMARY OF THE INVENTION

An object of the present invention is to provide moisture-curable one-component organosilicon compositions which are free from color and yet which provide adhesion to substrates, especially plastics and metals. These and other objects are surprisingly and unexpectedly achieved through a combination of organosilicon compounds containing condensable groups, organosilicon compounds containing basic nitrogen, and oxaldianilide(s).

DETAILED DESCRIPTION OF THE PREFERRED EMBODIMENT(S)

The invention thus relates to crosslinkable materials containing (A) compounds of the formula

$$A\text{-}[(CR^1{}_2)_b\text{—}SiR_a(OR^2)_{3-a}]_x \qquad (I),$$

in which
A is an x-valent polymer radical bonded via nitrogen, phosphorus, oxygen, sulfur, carbon or a carbonyl group,
R may be identical or different and is a monovalent, optionally substituted hydrocarbon radical,
$R^1$ may be identical or different and is a hydrogen atom or a monovalent, optionally substituted hydrocarbon radical which may be linked to the carbon atom via nitrogen, phosphorus, oxygen, sulfur or a carbonyl group,
$R^2$ may be identical or different and is a hydrogen atom or a monovalent, optionally substituted hydrocarbon radical,
x is an integer from 1 to 10, preferably 1, 2 or 3, more preferably 1 or 2,
a is 0, 1 or 2, preferably 0 or 1, and
b is an integer from 1 to 10, preferably 1, 2, 3 or 4, more preferably 1, 2 or 3,
(B) an organosilicon compound having basic nitrogen and
(C) an oxaldianilide of the formula

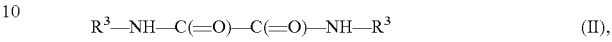

$$R^3\text{—NH—C}(\!=\!\text{O})\text{—C}(\!=\!\text{O})\text{—NH—}R^3 \qquad (II),$$

in which
$R^3$ may be identical or different and is a monovalent, optionally substituted phenyl radical.

Preferably, the compounds (A) of the formula (I) have a molecular weight of from 2000 g/mol to 100,000 g/mol, more preferably from 5000 g/mol to 50,000 g/mol, stated in each case as the number average.

Radicals R are preferably optionally substituted, monovalent hydrocarbon radicals having 1 to 18 carbon atoms, more preferably alkyl, vinyl, 3,3,3-trifluoroprop-1-yl, and phenyl radicals, in particular the methyl radical.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals; hexyl radicals such as the n-hexyl radical; heptyl radicals such as the n-heptyl radical; octyl radicals such as the n-octyl radical, isooctyl radicals, and the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl, and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as o-, m- and p-tolyl radicals, xylyl radicals and ethylphenyl radicals; and aralkyl radicals such as the benzyl radical and the α- and the β-phenylethyl radicals.

Examples of substituted radicals R are haloalkyl radicals such as the 3,3,3-trifluoro-n-propyl radical, the 2,2,2,2',2',2'-hexafluoroisopropyl radical and the heptafluoroisopropyl radical; haloaryl radicals such as the o-, m- and p-chlorophenyl radicals and the 2-methoxyethyl, 2-methoxypropyl, and 2-(2-methoxyethoxy)ethyl radicals.

Examples of radicals $R^1$ are hydrogen, the radicals stated for R, and optionally substituted hydrocarbon radicals bonded to the carbon atom via nitrogen, phosphorus, oxygen, sulfur, carbon or a carbonyl group. Radical $R^1$ is preferably a hydrogen atom or hydrocarbon radicals having 1 to 20 carbon atoms, in particular a hydrogen atom.

Radicals A are preferably organic polymer radicals which contain, as a polymer chain, polyoxyalkylenes such as polyoxyethylene, polyoxypropylene, polyoxybutylene, polyoxytetramethylene, polyoxyethylene-polyoxypropylene copolymer and polyoxypropylene-polyoxybutylene copolymer; hydrocarbon polymers such as polyisobutylene and copolymers of polyisobutylene with isoprene; polychloroprenes; polyisoprenes; polyurethanes; polyesters; polyamides; polyacrylates; polymethacrylates; vinyl polymers and polycarbonates and which are bonded via —O—C(=O)—NH—, —NH—C(=O)O—, —NH—C(=O)—NH—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O—, —NR'—, —CR'$_2$—, —P(=O)(OR')$_2$—, —O—CH$_2$—C (OH)H—CH$_2$—NR'—, —O—CH$_2$—C(OH)H—CH$_2$—S—, —O—CH$_2$—C(OH)H—CH$_2$—C(=O)—, —O—CH$_2$—C(OH)H—CH$_2$—O—,

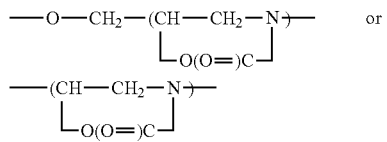

to the group —[(CR$^1_2$)$_b$—SiR$_a$(OR$^2$)$_{3-a}$], in which R' may be identical or different and is a hydrogen atom or has a meaning stated for R.

Radicals A are more preferably polyoxyalkylene and polyacrylate radicals, in particular polyoxyalkylene radicals, which are bonded via —O—C(=O)—NH—, —C(=O)—O—, —O—C(=O)—O—, —O—, —O—CH$_2$—C(OH)H—CH$_2$—NR'—, —O—CH$_2$—C(OH)H—CH$_2$—S—, —O—CH$_2$—C(OH)H—CH$_2$—C(=O)— or —O—CH$_2$—C(OH)H—CH$_2$—O— to the group [(CR$^1_2$)$_b$—SiR$_a$(OR$^2$)$_{3-a}$], in which R' may be identical or different and is a hydrogen atom or has a meaning stated for R.

If radicals A are polyoxyalkylene radicals A1, these preferably contain repeating units of the formula

in which

R$^7$ may be identical or different and is an optionally substituted divalent hydrocarbon radical having 1 to 12 carbon atoms, which may be linear or branched. The polyoxyalkylene radicals A1 preferably contain at least 50%, more preferably at least 70%, of repeating units of the formula (III), based in each case on the total number of repeating units. In addition to the repeating units of the formula (III), the radicals A1 may also contain further units such as, for example, amide, urea, urethane, thiourethane, alkylene, arylene, ester, carbonate, imide and imine units.

Examples of radical R$^7$ are —CH$_2$—, —CH$_2$—CH$_2$—, —CH$_2$—CH(CH$_3$)—, —CH$_2$—CH$_2$—CH$_2$—, —CH$_2$—CH(—CH$_2$—CH$_3$)—, —CH(CH$_3$)—CH(CH$_3$)—, —CH$_2$—CH$_2$—CH$_2$—CH$_2$— and —CH$_2$—C(CH$_3$)$_2$—. Radical R$^7$ is preferably a divalent, optionally substituted hydrocarbon radical having 1 to 4 carbon atoms, more preferably a divalent hydrocarbon radical having 1 to 4 carbon atoms, and most preferably —CH$_2$—CH$_2$— and —CH$_2$—CH(CH$_3$)—, in particular —CH$_2$—CH(CH$_3$)—.

If radicals A are polyacrylate radicals A2, they preferably contain repeating units of the formula

in which

R$^8$ may be identical or different and is a hydrogen atom or methyl radical and R$^9$ may be identical or different and is an optionally substituted, monovalent hydrocarbon radical. The radicals A2 preferably contain at least 50%, particularly preferably at least 70%, of repeating units of the formula (IV), based in each case on the total number of repeating units.

In addition to the repeating units of the formula (IV), the radicals A2 may also contain further groups such as styrene units, perfluoroethylene units, maleic acid units or the mono- or diester units thereof or derivatives thereof such as maleimides, fumaric acid units or the mono- or diester units thereof, nitrile units, vinyl ester units such as vinyl acetate or vinyl laurate units, alkene units such as ethylene, propylene or octylene units, conjugated diene units such as butadiene or isoprene units, vinyl chloride units, vinylene chloride units, allyl chloride units or allyl alcohol units. Following the usage customary in polymer chemistry, some of these units are named according to the monomers used in the polymerization process, which is known to those skilled in the art.

Examples of radical R$^9$ are the examples stated for radical R. Radicals R$^9$ are preferably optionally substituted hydrocarbon radicals having 1 to 30 carbon atoms, more preferably having 1 to 20 carbon atoms.

Examples of the repeating units according to formula (IV) are: —CH$_2$—C(CH$_3$)(COOCH$_3$)—, —CH$_2$—C(CH$_3$)(COOCH$_2$CH$_3$)—, —CH$_2$—C(CH$_3$)(COOCH$_2$CH$_2$CH$_3$)—, —CH$_2$—C(CH$_3$)(COOCH$_2$CH$_2$CH$_2$CH$_3$)—, —CH$_2$—C(CH$_3$)(COOCH(CH$_3$)$_2$)—, —CH$_2$—C(CH$_3$)(COO(CH$_2$)$_4$CH$_3$)—, —CH$_2$—C(CH$_3$)(COO(CH$_2$)$_5$CH$_3$)—, —CH$_2$—C(CH$_3$)(COO-Cyclohexyl)-, —CH$_2$—C(CH$_3$)(COO(CH$_2$)$_6$CH$_3$)—, —CH$_2$—C(CH$_3$)(COO(CH$_2$)$_7$CH$_3$)—, —CH$_2$—C(CH$_3$)(COOCH$_2$CH(CH$_2$CH$_3$)CH$_2$CH$_2$CH$_2$CH$_3$)—, —CH$_2$—C(CH$_3$)(COOCH$_2$CH(CH$_3$)CH$_2$C(CH$_3$)$_3$)—, —CH$_2$—C(CH$_3$)(COO(CH$_2$)$_8$CH$_3$)—, —CH$_2$—C(CH$_3$)(COO(CH$_2$)$_9$CH$_3$)—, —CH$_2$—C(CH$_3$)(COO(CH$_2$)$_{11}$CH$_3$)—, —CH$_2$—C(CH$_3$)(COO(CH$_2$)$_{13}$CH$_3$)—, —CH$_2$—C(CH$_3$)(COO(CH$_2$)$_{15}$CH$_3$)—, —CH$_2$—C(CH$_3$)(COO(CH$_2$)$_{17}$CH$_3$)—, —CH$_2$—C(CH$_3$)(COOPh)—, —CH$_2$—C(CH$_3$)(COO(CH$_2$Ph))—, —CH$_2$—C(CH$_3$)(COOCH$_2$CH$_2$OCH$_3$)—, —CH$_2$—C(CH$_3$)(COOCH$_2$CH$_2$OH)—, —CH$_2$—C(CH$_3$)(COOCH$_2$CH(OCH$_3$)CH$_3$)—, —CH$_2$—C(CH$_3$)(COOCH$_2$CH(OH)CH$_3$)—, —CH$_2$—C(CH$_3$)(COO-Glycidyl)-, —CH$_2$—C(CH$_3$)(COO—CH$_2$CH$_2$CH$_2$Si(OCH$_3$)$_3$)—, —CH$_2$—C(CH$_3$)(COO—CH$_2$CH$_2$CH$_2$Si(OCH$_3$)$_2$CH$_3$)—, —CH$_2$—C(CH$_3$)(COO—(CH$_2$CH$_2$O)$_x$H)—, —CH$_2$—C(CH$_3$)(COOCF$_3$)—, —CH$_2$—C(CH$_3$)(COOCH$_2$CH$_2$CF$_3$)— and —CH$_2$—C(CH$_3$)(COOCH$_2$CH$_2$CF$_2$CF$_3$)—; and —CH$_2$—C(H)(COOCH$_3$)—, —CH$_2$—C(H)(COOCH$_2$CH$_3$)—, —CH$_2$—C(H)(COOCH$_2$CH$_2$CH$_3$)—, —CH$_2$—C(H)(COOCH$_2$CH$_2$CH$_2$CH$_3$)—, —CH$_2$—C(H)(COOCH(CH$_3$)$_2$)—, —CH$_2$—C(H)(COOCH$_2$CH(CH$_3$)$_2$)—, —CH$_2$—C(H)(COOC(CH$_3$)$_3$)—, —CH$_2$—C(H)(COO(CH$_2$)$_4$CH$_3$)—, —CH$_2$—C(H)(COO(CH$_2$)$_5$CH$_3$)—, —CH$_2$—C(CH$_3$)(COOCH$_2$CH$_2$OCH$_3$)—, —CH$_2$—C(CH$_3$)(COOCH$_2$CH$_2$OCH$_2$CH$_3$)—, —CH$_2$—C(CH$_3$)(COOCH$_2$CH$_2$CH(OCH$_3$)CH$_3$)— and —CH$_2$—C(H)(COOCH$_2$CH(CH$_2$CH$_3$)CH$_2$CH$_2$CH$_2$CH$_3$)—, where Ph is a phenyl radical, Cyclohexyl is a cyclohexyl radical, Glycidyl is a glycidyl radical, and x is a number from 1 to 10.

Particularly preferred repeating units of the formula (IV) are —CH$_2$—C(CH$_3$)(COOCH$_3$)—, —CH$_2$—C(CH$_3$)(COOCH$_2$CH$_3$)—, —CH$_2$—C(CH$_3$)(COOCH$_2$CH$_2$CH$_3$)—, —CH$_2$—C(CH$_3$)(COOCH$_2$CH$_2$CH$_2$CH$_3$)—, —CH$_2$—C(CH$_3$)(COOCH(CH$_3$)$_2$)—, —CH$_2$—C(CH$_3$)(COO(CH$_2$)$_4$CH$_3$)—, —CH$_2$—C(CH$_3$)(COO(CH$_2$)$_5$CH$_3$)—, —CH$_2$—C(CH$_3$)(COO-Cyclohexyl)-, —CH$_2$—C(CH$_3$)(COO(CH$_2$)$_6$CH$_3$)—, —CH$_2$—C(CH$_3$)(COO(CH$_2$)$_7$CH$_3$)—, —CH$_2$—C(CH$_3$)(COOCH$_2$CH(CH$_2$CH$_3$)CH$_2$CH$_2$CH$_2$CH$_3$)—, —CH$_2$—C(CH$_3$)(COOCH$_2$CH(CH$_3$)CH$_2$C(CH$_3$)$_3$)—, —CH$_2$—C(CH$_3$)(COO(CH$_2$)$_8$CH$_3$)—, —CH$_2$—C(CH$_3$)(COO(CH$_2$)$_9$CH$_3$)—, —CH$_2$—C(CH$_3$)(COO(CH$_2$)$_{11}$CH$_3$)—, —CH$_2$—C(CH$_3$)(COO(CH$_2$)$_{13}$CH$_3$)—, —CH$_2$—C(CH$_3$)(COO(CH$_2$)$_{15}$CH$_3$)—, —CH$_2$—C(CH$_3$)(COO(CH$_2$)$_{17}$CH$_3$)—, —CH$_2$—C(CH$_3$)(COOCH$_2$CH$_2$OCH$_3$)—, —CH$_2$—C(CH$_3$)(COOCH$_2$CH$_2$CH(OCH$_3$)CH$_3$)—, —CH$_2$—C(H)(COOCH$_3$)—, —CH$_2$—C(H)(COOCH$_2$CH$_3$)—, —CH$_2$—C(H)(COOCH$_2$CH$_2$CH$_3$)—, —CH$_2$—C(H)(COOCH(CH$_3$)$_2$)—, —CH$_2$—C(H)(COOCH$_2$CH (CH$_3$)$_2$)—, —CH$_2$—C(H)(COOC(CH$_3$)$_3$)—, —CH$_2$—C(H)(COO(CH$_2$)$_4$CH$_3$)—, —CH$_2$—C(H)(COO(CH$_2$)$_5$CH$_3$)—, —CH$_2$—C(CH$_3$)(COOCH$_2$CH$_2$OCH$_3$)—, —CH$_2$—C(CH$_3$)(COOCH$_2$CH$_2$OCH$_2$CH$_3$)—, —CH$_2$—C(CH$_3$)(COOCH$_2$CH(OCH$_3$)CH$_3$)— and —CH$_2$—C(H)(COOCH$_2$CH(CH$_2$CH$_3$)CH$_2$CH$_2$CH$_3$)—, where Cyclohexyl is a cyclohexyl radical.

The radicals A, more preferably the polyoxyalkylene radicals A1, preferably contain units of the formula

—NR$^{10}$—C(=O)—     (V), in which
R$^{10}$ may be identical or different and is a hydrogen atom or an optionally substituted, monovalent hydrocarbon radical. Examples of radical R$^{10}$ are a hydrogen atom and the examples stated for radical R. Radical R$^{10}$ is preferably a hydrogen atom or an optionally substituted hydrocarbon radical having 1 to 12 carbon atoms, more preferably a hydrogen atom or a hydrocarbon radical having 1 to 6 carbon atoms.

Examples of radical R$^2$ are a hydrogen atom or the examples stated for radical R. Radical R$^2$ is preferably a hydrogen atom or an alkyl radical having 1 to 12 carbon atoms, more preferably an alkyl radical having 1 to 4 carbon atoms, in particular the methyl and ethyl radical.

Examples of component (A) are organic polymers having tris(organyloxy)silylalkyl groups or bis(organyloxy)methylsilylalkyl groups such as polyacrylates, vinyl polymers, polyurethanes and polyglycols, which may be linear or branched. The preparation of these polymers can be effected by known processes such as addition reactions such as, for example, hydrosilylation, Michael addition, Diels-Alder addition, the addition reaction of isocyanate with epoxides or with reactive groups having active hydrogen such as amines, amides, hydroxyl or mercapto groups, the addition reaction of epoxides with reactive groups having active hydrogen such as amines, carbonyl groups, phenols or mercapto groups, and the addition reaction of aziridines with carbonyl groups, the grafting of vinyl silanes onto vinyl polymers or the copolymerization of vinyl silanes and/or methacryloyloxypropylsilanes and/or methacryloyloxymethylsilanes with organic monomers having a double bond, it being possible, by using the controlled free radical polymerization according to the nitroxyl-controlled CFRP, the ATRP or the RAFT process, to prepare polymers having a narrow molar mass distribution, which carry the silyl groups at the polymer ends. The preparation methods can optionally be combined with one another.

However, copolymers comprising siloxane blocks and organic polymers can also be used as component (A), as described, for example, in EP-B1 1 370 602, which is incorporated herein by reference. The polymers (A) may be homopolymers as well as copolymers, which in each case may be linear or branched. The component (A) may have the groups —[(CR$^1$$_2$)$_b$—SiR$_a$(OR$^2$)$_{3-a}$] at any points in the polymer such as, for example, on the chain and/or in a terminal position. The component (A) preferably has a viscosity of from 100 to 1,000,000 mPa·s, more preferably from 1000 to 350,000 mPa·s, in each case at 25° C. Components (A) are commercially available products or can be prepared by methods customary in chemistry.

Component (B) is preferably an organosilicon compound containing units of the formula

R$^{12}$$_k$D$_l$Si(OR$^{13}$)$_m$O$_{(4-k-l-m)/2}$     (VI), in which
R$^{12}$ may be identical or different and is a monovalent, optionally substituted SiC-bonded organic radical free of basic nitrogen, R$^{13}$ may be identical or different and is a hydrogen atom or optionally substituted hydrocarbon radical,
D may be identical or different and is a monovalent, Si-bonded radical containing basic nitrogen,
k is 0, 1, 2 or 3,
l is 0, 1, 2, 3 or 4 and
m is 0, 1, 2 or 3,
with the proviso that the sum k+l+m is less than or equal to 4 and at least one radical D is present per molecule.

Examples of radical R$^{12}$ are the examples stated for R. Radical R$^{12}$ is preferably a hydrocarbon radical having 1 to 18 carbon atoms, the methyl, ethyl and n-propyl radicals being particularly preferred, in particular the methyl radical.

Examples of optionally substituted hydrocarbon radicals R$^{13}$ are the examples stated for radical R$^2$. The radicals R$^{13}$ are preferably a hydrogen atom and hydrocarbon radicals optionally substituted by nitrogen and oxygen and having 1 to 18 carbon atoms, more preferably a hydrogen atom and hydrocarbon radicals having 1 to 3 carbon atoms, in particular, hydrogen, methyl, or ethyl.

Examples of radicals D are radicals of the formulae H$_2$N(CH$_2$)$_2$—, H$_2$N(CH$_2$)$_3$—, H$_2$N(CH$_2$)$_2$NH(CH$_2$)$_2$—, H$_2$N(CH$_2$)$_2$NH(CH$_2$)$_3$—, H$_2$N(CH$_2$)$_2$NH(CH$_2$)$_2$NH(CH$_2$)$_3$—, H$_3$CNH(CH$_2$)$_3$—, C$_2$H$_5$NH(CH$_2$)$_3$—, H$_3$CNH(CH$_2$)$_2$—, C$_2$H$_5$NH(CH$_2$)$_2$—, H$_2$N(CH$_2$)$_4$—, H$_2$N(CH$_2$)$_5$—, H(NHCH$_2$CH$_2$)$_3$—, C$_4$H$_9$NH(CH$_2$)$_2$NH(CH$_2$)$_3$—, cyclo-C$_6$H$_{11}$NH(CH$_2$)$_3$—, cyclo-C$_6$H$_{11}$NH(CH$_2$)$_2$—, (CH$_3$)$_2$N(CH$_2$)$_3$—, (CH$_3$)$_2$N(CH$_2$)$_2$—, (C$_2$H$_5$)$_2$N(CH$_2$)$_3$—, cyclo-C$_6$H$_{11}$NH—, CH$_3$CH$_2$CH(CH$_3$)NH— and (C$_2$H$_5$)$_2$N(CH$_2$)$_2$— and reaction products of the abovementioned primary amino groups with compounds which contain double bonds reactive toward primary amino groups or contain epoxide groups.

Radical D is preferably an H$_2$N(CH$_2$)$_3$—, H$_2$N(CH$_2$)$_2$NH(CH$_2$)$_3$—, H$_3$CNH(CH$_2$)$_3$—, C$_2$H$_5$NH(CH$_2$)$_3$—, cyclo-C$_6$H$_{11}$NH—, CH$_3$CH$_2$CH(CH$_3$)NH— or cyclo-C$_6$H$_{11}$NH(CH$_2$)$_3$— radical and reaction products of the abovementioned primary amino groups with compounds which contain double bonds reactive toward primary amino groups or contain epoxide groups, an H$_2$N(CH$_2$)$_3$—, H$_2$N(CH$_2$)$_2$NH(CH$_2$)$_3$—, H$_3$CNH(CH$_2$)$_3$—, C$_2$H$_5$NH(CH$_2$)$_3$—, cyclo-C$_6$H$_{11}$NH—, CH$_3$CH$_2$CH(CH$_3$)NH— and cyclo-C$_6$H$_{11}$NH(CH$_2$)$_3$— radical being particularly preferred, in particular the H$_2$N(CH$_2$)$_3$—, H$_2$N(CH$_2$)$_2$NH(CH$_2$)$_3$— and cyclo-C$_6$H$_{11}$NH(CH$_2$)$_3$— radicals.

The organosilicon compounds (B) may be both silanes, i.e. compounds of the formula (VI) where k+l+m=4, and siloxanes, i.e. compounds containing units of the formula (VI) where k+l+m≦3. If the organosilicon compounds used are organopolysiloxanes, those which consist of units of the formula (VI) are preferred.

If the organosilicon compounds containing units of the formula (VI) are silanes, k is preferably 0, 1 or 2, more preferably 0 or 1, l is preferably 1 or 2, more preferably 1, and m is preferably 1, 2 or 3, more preferably 2 or 3, with the proviso that the sum k+l+m is equal to 4.

Examples of the silanes of the formula (VI) which are optionally used are H$_2$N(CH$_2$)$_3$—Si(OCH$_3$)$_3$, H$_2$N(CH$_2$)$_3$—Si(OC$_2$H$_5$)$_3$, H$_2$N(CH$_2$)$_3$—Si(OCH$_3$)$_2$CH$_3$, H$_2$N(CH$_2$)$_3$—Si(OC$_2$H$_5$)$_2$CH$_3$, H$_2$N(CH$_2$)$_2$NH(CH$_2$)$_3$—Si(OCH$_3$)$_3$, H$_2$N(CH$_2$)$_2$NH(CH$_2$)$_3$—Si(OC$_2$H$_5$)$_3$, H$_2$N(CH$_2$)$_2$NH(CH$_2$)$_3$—Si(OCH$_3$)$_2$CH$_3$, H$_2$N(CH$_2$)$_2$NH(CH$_2$)$_3$—Si(OC$_2$H$_5$)$_2$CH$_3$, (CH$_3$)$_3$Si—NH—Si(CH$_3$)$_3$, H$_2$N(CH$_2$)$_2$NH(CH$_2$)$_3$—Si(OH)$_3$, H$_2$N(CH$_2$)$_2$NH(CH$_2$)$_3$—Si(OH)$_2$CH$_3$, H$_2$N(CH$_2$)$_2$NH(CH$_2$)$_2$NH(CH$_2$)$_3$—Si(OCH$_3$)$_3$, H$_2$N(CH$_2$)$_2$NH(CH$_2$)$_2$NH(CH$_2$)$_3$—Si(OC$_2$H$_5$)$_3$, cyclo-C$_6$H$_{11}$NH(CH$_2$)$_3$—Si(OCH$_3$)$_3$, cyclo-C$_6$H$_{11}$NH(CH$_2$)$_3$—Si(OC$_2$H$_5$)$_3$, cyclo- $C_6H_{11}NH(CH_2)_3$—$Si(OCH_3)_2CH_3$, cyclo-$C_6H_{11}NH(CH_2)_3$—$Si(OC_2H_5)_2CH_3$, cyclo-$C_6H_{11}NH(CH_2)_3$—$Si(OH)_3$, cyclo-$C_6H_{11}NH(CH_2)_3$—$Si(OH)_2CH_3$, $(CH_3)_2Si(NHCH(CH_3)CH_2CH_3)_2$, (cyclo-$C_6H_{11}NH)_3Si$—$CH_3$, $(CH_3CH_2(CH_3)CHNH)_3Si$—$CH_3$, $HN((CH_2)_3$—$Si(OCH_3)_3)_2$ and $HN((CH_2)_3$—$Si(OC_2H_5)_3)_2$ and the partial hydrolysis products thereof, $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, $H_2N(CH_2)_2NH(CH_2)_3$—$Si(OC_2H_5)_2CH_3$, $H_2N(CH_2)_2NH(CH_2)_3$—$Si(OH)_3$, $H_2N(CH_2)_2NH(CH_2)_3$—$Si(OH)_2CH_3$, cyclo-$C_6H_{11}NH(CH_2)_3$—$Si(OCH_3)_3$, cyclo-$C_6H_{11}NH(CH_2)_3$—$Si(OC_2H_5)_3$, cyclo-$C_6H_{11}NH(CH_2)_3$—$Si(OCH_3)_2CH_3$, cyclo-$C_6H_{11}NH(CH_2)_3$—$Si(OC_2H_5)_2CH_3$, cyclo-$C_6H_{11}NH(CH_2)_3$—$Si(OH)_3$ and cyclo-$C_6H_{11}NH(CH_2)_3$—$Si(OH)_2CH_3$ being preferred and $H_2N(CH_2)_2NH(CH_2)_3$—$Si(OCH_3)_3$, $H_2N(CH_2)_2NH(CH_2)_3$—$Si(OCH_3)_2CH_3$, cyclo-$C_6H_{11}NH(CH_2)_3$—$Si(OCH_3)_3$, cyclo-$C_6H_{11}NH(CH_2)_3$—$Si(OCH_3)_2CH_3$, $H_2N(CH_2)_2NH(CH_2)_3$—$Si(OH)_3$ and $H_2N(CH_2)_2NH(CH_2)_3$—$Si(OH)_2CH_3$ and the partial hydrolysis products thereof in each case being particularly preferred.

If the organosilicon compound containing units of the formula (VI) is an organopolysiloxane, the average value of k is preferably from 0.5 to 2.5, more preferably from 1.4 to 2.0, the average value of l is preferably from 0.01 to 1.0, more preferably from 0.01 to 0.6, and the average value of m is preferably from 0 to 2.0, more preferably from 0 to 0.2, with the proviso that the sum of k, l and m is less than or equal to 3.

Examples of the siloxanes optionally used and containing units of the formula (VI) are $H_2N(CH_2)_3$—$Si(OCH_3)_2$—O—$Si(CH_3)(OCH_3)_2$, $H_2N(CH_2)_3$—$Si(OC_2H_5)_2$—O—$Si(CH_3)(OCH_3)_2$, $H_2N(CH_2)_3$—$Si(OC_2H_5)_2$—O—$Si(CH_3)(OC_2H_5)_2$, $H_2N(CH_2)_3$—$Si(OCH_3)(CH_3)$—O—$Si(CH_3)(OCH_3)_2$, $H_2N(CH_2)_3$—$Si(OCH_3)(CH_3)$—O—$Si(OCH_3)_3$, $H_2N(CH_2)_3$—$Si(OC_2H_5)(CH_3)$—O—$Si(OCH_3)_3$, $H_2N(CH_2)_2NH(CH_2)_3$—$Si(OCH_3)_2$—O—$Si(CH_3)(OCH_3)_2$, $H_2N(CH_2)_2NH(CH_2)_3$—$Si(OC_2H_5)_2$—O—$Si(CH_3)(OCH_3)_2$, $H_2N(CH_2)_2NH(CH_2)_3$—$Si(OC_2H_5)_2$—O—$Si(CH_3)(OC_2H_5)_2$, $H_2N(CH_2)_2NH(CH_2)_3$—$Si(OCH_3)(CH_3)$—O—$Si(CH_3)(OCH_3)_2$, $H_2N(CH_2)_2NH(CH_2)_3$—$Si(OCH_3)(CH_3)$—O—$Si(OCH_3)_3$, $H_2N(CH_2)_2NH(CH_2)_3$—$Si(OC_2H_5)(CH_3)$—O—$Si(OCH_3)_3$, cyclo-$C_6H_{11}NH(CH_2)_3$—$Si(OCH_3)_2$—O—$Si(CH_3)(OCH_3)_2$, cyclo-$C_6H_{11}NH(CH_2)_3$—$Si(OC_2H_5)_2$—O—$Si(CH_3)(OCH_3)_2$, cyclo-$C_6H_{11}NH(CH_2)_3$—$Si(OC_2H_5)_2$—O—$Si(CH_3)(OC_2H_5)_2$, cyclo-$C_6H_{11}NH(CH_2)_3$—$Si(OCH_3)(CH_3)$—O—$Si(CH_3)(OCH_3)_2$, cyclo-$C_6H_{11}NH(CH_2)_3$—$Si(OCH_3)(CH_3)$—O—$Si(OCH_3)_3$, cyclo-$C_6H_{11}NH(CH_2)_3$—$Si(OC_2H_5)(CH_3)$—O—$Si(OCH_3)_3$, $H_2N(CH_2)_3$—$Si(OCH_3)_2$—(O—$Si(CH_3)_2)_{0-100}$—(O—$Si(CH_3)$—$(CH_2)_3$—$NH_2)_{0-100}$—O—$Si(OCH_3)_2$—$(CH_2)_3NH_2$, $H_2N(CH_2)_2NH(CH_2)_3$—$Si(OCH_3)_2$—(O—$Si(CH_3)_2)_{0-100}$—(O—$Si(CH_3)$—$(CH_2)_3$—$NH(CH_2)_2NH_2)_{0-100}$—O—$Si(OCH_3)_2$—$(CH_2)_3NH(CH_2)_2NH_2$, $H_2N(CH_2)_3$—$Si(OCH_2CH_3)_2$—(O—$Si(OCH_2CH_3)_2)_{1-100}$—(O—$Si(OCH_2CH_3)(CH_2)_3NH_2)_{0-100}$—O—$Si(OCH_2CH_3)_2$—$(CH_2)_3NH_2$, $Si(OCH_2CH_3)_3$-(O—$Si(OCH_2CH_3)_2)_{0-100}$—(O—$Si(OCH_2CH_3)(CH_2)_3NH_2)_{1-100}$—O—Si—$(OCH_2CH_3)_3$ and cyclo-$C_6H_{11}NH(CH_2)_3$—$Si(OCH_3)_2$—(O—$Si(CH_3)_2)_{0-100}$—(O—$Si(CH_3)$—$(CH_2)_3$—NH—cyclo-$C_6H_{11})_{0-100}$—O—$Si(OCH_3)_2$—$(CH_2)_3NH$ cyclo-$C_6H_{11}$.

Component (B) is preferably $H_2N(CH_2)_3$—$Si(OCH_3)_3$, $H_2N(CH_2)_3$—$Si(OC_2H_5)_3$, $H_2N(CH_2)_3$—$Si(OCH_3)_2CH_3$, $H_2N(CH_2)_3$—$Si(OC_2H_5)_2CH_3$, $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, $(CH_3)_2Si(NHCH(CH_3)CH_2CH_3)_2$, $H_2N(CH_2)_3$—$Si(OCH_3)_2$—(O—S$(CH_3)_2)_{0-100}$—(O—$Si(CH_3)$—$(CH_2)_3$—$NH_2)_{0-100}$—O—$Si(OCH_3)_2$—$(CH_2)_3NH_2$, $H_2N(CH_2)_2NH(CH_2)_3$—$Si(OCH_3)_2$—(O—$Si(CH_3)_2)_{0-100}$—(O—$Si(CH_3)$—$(CH_2)_3NH(CH_2)_2NH_2)_{0-100}$—O—$Si(OCH_3)_2$—$(CHCH_2)_3NH(CH_2)_2NH_2$, $H_2N(CH_2)3$-$Si(OCH_2CH_3)_2$—(O—$Si(OCH_2CH_3)_2)_{1-100}$—(O—Si$(OCH_2CH_3)(CH_2)_3NH_2)_{0-100}$—O—$Si(OCH_2CH_3)_2$—$(CH_2)_3NH_2$, $Si(OCH_2CH_3)_3$—(O—$Si(OCH_2CH_3)_2)_{0-100}$—(O—$Si(OCH_2CH_3)(CH_2)_3NH_2)_{1-100}$—O—Si $(OCH_2CH_3)_3$, (cyclo-$C_6H_{11}NH)_3Si$—$CH_3$, $(CH_3CH_2(CH_3)CHNH)_3Si$—$CH_3$, $(CH_3CH_2(CH_3)CHNH)_2Si$—$(CH_3)_2$, $((CH_3)_2N)_2C$=$N$—$CH_2CH_2CH_2Si(OCH_3)_3$, $((CH_3)_2N)_2C$=$N$—$CH_2CH(OH)CH_2O(CH_2)_3Si(OCH_3)_3$, whereby $H_2N(CH_2)_3$—$Si(OCH_3)_3$, $H_2N(CH_2)_3$—$Si(OC_2H_5)_3$, $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2$—(O—$Si(CH_3)_2)_{0-100}$—(O—$Si(CH_3)$—$(CH_2)_3$—$NH(CH_2)_2NH_2)_{0-100}$—O—$Si(OCH_3)_2$—$(CH_2)_3NH(CH_2)_2NH_2$, $H_2N(CH_2)_3$—$Si(OCH_2CH_3)_2$—(O—$Si(OCH_2CH_3)_2)_{1-100}$—(O—$Si(OCH_2CH_3)(CH_2)_3NH_2)_{0-100}$—O—$Si(OCH_2CH_3)_2$—$(CH_2)_3NH_2$, $Si(OCH_2CH_3)3$-(O—$Si(OCH_2CH_3)_2)_{0-100}$—(O—$Si(OCH_2CH_3)(CH_2)_3NH_2)_{1-100}$—O—$Si(OCH_2CH_3)_3$, $((CH_3)_2N)_2C$=$N$—$CH_2CH_2CH_2Si(OCH_3)_3$ and $((CH_3)_2N)_2$ C=$N$—$CH_2CH(OH)CH_2O(CH_2)_3Si(OCH_3)_3$ are particularly preferred, in particular $H_2N(CH_2)_3$—$Si(OCH_3)_3$, $H_2N(CH_2)_3$—$Si(OC_2H_5)_3$, $H_2N(CH_2)_2NH(CH_2)_3Si(OCH_3)_3$ and $H_2N(CH_2)_2NH(CH_2)_3$—$Si(OC_2H_5)_3$.

Further examples of component (B) are reaction products of the abovementioned silanes or siloxanes containing primary amino groups with compounds which contain double bonds reactive to primary amino groups or contain epoxide groups, with retention of the basic character of the nitrogen. Examples of compounds having reactive double bonds are (3-methacryloyloxypropyl)trimethoxysilane, (3-methacryloyloxypropyl)triethoxysilane, (methacryloyloxymethyl)trimethoxysilane, (methacryloyloxymethyl)triethoxysilane, (methacryloyloxymethyl)methyldimethoxysilane, (methacryloyloxymethyl)methyldiethoxysilane, acrylonitrile, 1,6-hexanediol diacrylate, 1,6-hexanediylbis[oxy(2-hydroxy-3,1-propanediyl)]bisacrylate and diethyl maleate. Examples of compounds having epoxide groups are 3-glycidyloxypropyltrimethoxysilane, 3-glycidyloxyoxypropyltrimethoxysilane, glycidyl isobutyl ether, epoxidized soybean oil, o-cresyl glycidyl ether, trimethylolpropane triglycidyl ether, and 1,4-butanediol diglycidyl ether. These reaction products can be used as such directly in the preparation of the compositions. However, they may also first form in the compositions by using silanes or siloxanes containing primary amino groups and compounds which contain double bonds reactive toward primary amino groups or contain epoxide groups for the preparation thereof.

Components (B) are commercially available products or can be prepared by processes customary in chemistry. The compositions of the invention preferably contain component (B) in amounts of from 0.001 to 10 parts by weight, more preferably from 0.01 to 5 parts by weight, and in particular from 0.05 to 2 parts by weight, based in each case on 100 parts by weight of component (A).

Radicals $R^3$ are preferably phenyl, alkylphenyl, alkoxyphenyl or alkyl(alkoxy)phenyl radicals, it being possible for the alkyl and alkoxy groups to be present in any position on the phenyl ring. Radicals $R^3$ are more preferably phenyl, alkylphenyl, alkoxyphenyl or alkyl(alkoxy)phenyl radicals, it being possible for the alkyl and alkoxy groups to contain in each case 1 to 18 carbon atoms and to be present in any position on the phenyl ring. Examples of radicals $R^3$ are the phenyl, 2-ethylphenyl, 4-ethylphenyl, 2-ethoxyphenyl, 4-ethoxyphenyl, 4-isododecylphenyl and 5-(tert-butyl)-2-ethoxyphenyl radicals.

The compound (C) is preferably N-(2-ethoxyphenyl)-N'-(2-ethylphenyl)ethylenediamide (CAS: 23949-66-8), N,N'-diphenylethylenediamide (CAS: 620-81-5), N-(5-(1,1-dimethylethyl)-2-ethoxyphenyl)-N'-(2-ethylphenyl) ethylenediamide (CAS: 35001-52-6) and N-(2-ethoxyphenyl)-N'-(4-isododecylphenyl)ethylenediamide (CAS: 82493-14-9), whereby N-(2-ethoxyphenyl)-N'-(2-ethylphenyl)ethylenediamide (CAS: 23949-66-8) and N-(2-ethoxyphenyl)-N'-(4-isododecylphenyl)ethylenediamide (CAS: 82493-14-9) are particularly preferred.

The compositions of the invention preferably contain component (C) in amounts of from 0.01 to 10 parts by weight, more preferably from 0.05 to 5 parts by weight, and in particular from 0.1 to 3 parts by weight, based in each case on 100 parts by weight of component (A). The components (C) used are commercially available products or can be prepared by methods customary in chemistry.

Furthermore, the compositions may contain all constituents that are also useful in crosslinkable materials, for example, crosslinking agents (D), plasticizers (E), fillers (F), adhesion promoters (G), organic solvents (H), catalyst (K) and additives (L), where (D), (E) and (G) differ from the components (A) and (B).

The crosslinking agents (D) optionally used in the compositions may be any crosslinking agents having at least two condensable radicals such as silanes and siloxanes having at least two organyloxy groups, which differ from component (A) and component (B).

The crosslinking agents (D) optionally used in the compositions of the invention are preferably siloxane crosslinking agents and silane crosslinking agents such as tetramethoxysilane, tetraethoxysilane, tetrapropoxysilane, tetrabutoxysilane, methyltrimethoxysilane, dimethyldimethoxysilane, methyltriethoxysilane, methylvinyldimethoxysilane, vinyltrimethoxysilane, butyltrimethoxysilane, vinyltriethoxysilane, phenyltrimethoxysilane, diphenyldimethoxysilane, phenyltriethoxysilane, 1,1,1-trimethyl-3-dimethoxy-3-vinyldisiloxane, 1,1,1-trimethyl-3 ethoxy-3-methoxy-3-vinyldisiloxane, 1,1,1-trimethyl-3-trimethoxydisiloxane, 1,1,1-trimethyl-3-diethoxy-3-vinyldisiloxane, 1,1,1,5,5,5-hexamethyl-3,3-dimethoxytrisiloxane, 1,1,1,5,5,5-hexamethyl-3,3-diethoxytrisiloxane, 1,1,1,5,5,5-hexamethyl-3-ethoxy-3-methoxytrisiloxane, (N-cyclohexylaminomethyl)methyldiethoxysilane, (N-cyclohexylaminomethyl)methyldimethoxysilane, (N-cyclohexyl-aminomethyl)methylethoxymethoxysilane, (N-cyclohexylaminomethyl)triethoxysilane, (N-cyclohexylaminomethyl)trimethoxysilane, (N-phenylaminomethyl)methyldiethoxysilane, (N-phenylaminomethyl)trimethoxysilane, (methacryloyloxymethyl)trimethoxysilane, (methacryloyloxymethyl)triethoxysilane, (methacryloyloxymethyl)methyldimethoxysilane, (methacryloyloxymethyl)methyldiethoxysilane, (N-morpholinomethyl)triethoxysilane, N-(trimethoxysilylmethyl) O-methyl carbamate, N-(methyldimethoxysilylmethyl) O-methyl carbamate, 3-cyanopropyltrimethoxysilane, 3-cyanopropyltriethoxysilane, 3-(glycidoxy)propyltriethoxysilane, 1,2-bis(trimethoxysilyl)ethane, 1,2-bis(triethoxysilyl)ethane, methyltriacetoxysilane, ethyltriacetoxysilane, propyltriacetoxysilane, di-tert-butoxydiacetoxysilane, methyltris(methylethylketoximo)silane and vinyltris(methylethylketoximo)silane, tetrakis(methylethylketoximo)silane, bis (N-methylbenzamido)ethoxymethylsilane, methyltris(propenyloxy)silane, vinyltris(propenyloxy)silane and the partial hydrolysis products thereof which can optionally also be prepared by cohydrolysis such as, for example, by cohydrolysis of methyltrimethoxysilane and dimethyldimethoxysilane.

The crosslinking agents (D) are more preferably vinyltrimethoxysilane, 1,1,1-trimethyl-3-dimethoxy-3-vinyldisiloxane, N-(trimethoxysilylmethyl) O-methyl carbamate and N-(methyldimethoxysilylmethyl) O-methyl carbamate and the partial hydrolysis products thereof.

The optional crosslinking agents (D) are commercially available products or can be prepared by processes known in silicon chemistry. If the compositions contain crosslinking agents (D), the amounts are preferably from 0.1 to 10 parts by weight, more preferably from 0.5 to 3 parts by weight, based in each case on 100 parts by weight of component (A). Preferably, the compositions contain crosslinking agent (D).

The plasticizers (E) optionally used in the compositions may be any useful plasticizers which differ from component (A), component (B) and component (D). Examples of plasticizers (E) are dimethylpolysiloxanes which are liquid at room temperature and endcapped by trimethylsilyloxy groups, in particular those having viscosities at 25° C. in the range from 50 to 1000 mPa·s, and high-boiling hydrocarbons, for example, liquid paraffins, dialkylbenzenes, dialkylnaphthalenes or mineral oils consisting of naphthenic and paraffinic units, polyglycols, in particular polyoxypropylene glycols, which can optionally be substituted, high-boiling esters such as phthalates, citric acid esters or diesters of dicarboxylic acids, liquid polyesters, polyacrylates or polymethacrylates and alkanesulfonic acid esters.

If the compositions contain plasticizers (E), the amounts are preferably from 1 to 300 parts by weight, more preferably from 10 to 200 parts by weight, and in particular from 20 to 100 parts by weight, based in each case on 100 parts by weight of constituent (A). The compositions preferably contain plasticizers (E).

The fillers (F) optionally used in the compositions may be any useful fillers. Examples of fillers (F) are non-reinforcing fillers, i.e. fillers having a BET surface area of up to 50 m$^2$/g such as quartz, diatomaceous earth, calcium silicate, zirconium silicate, zeolites, metal oxide powders such as aluminum, titanium, iron or zinc oxides or mixed oxides thereof, barium sulfate, calcium carbonate, gypsum, silicon nitride, silicon carbide, boron nitride, glass powders, and plastic powders such as polyacrylonitrile powders; reinforcing fillers, i.e. fillers having a BET surface area of more than 50 m$^2$/g such as pyrogenically prepared silica, precipitated silica, precipitated chalk, carbon black such as furnace black and acetylene black, and silicon-aluminum mixed oxides of large BET surface area; fillers in the form of hollow spheres such as ceramic microspheres, for example, those obtainable under the trade name Zeeospheres™ from 3M Deutschland GmbH in D-Neuss, elastic plastic spheres such as, for example, those obtainable under the trade name EXPANCEL® from AKZO NOBEL, Expancel in Sundsvall, Sweden, or glass spheres; and fibrous fillers such as asbestos and plastic fibers. The fillers may have been rendered water-repellant, for example by treatment with organosilanes or organosiloxanes or with stearic acid or by etherification of hydroxyl groups to give alkoxy groups.

The optional fillers (F) are preferably substantially dry. This can be achieved, for example, by subjecting the fillers (F) to low pressures, heating them to temperatures of from 50° C. to 1500° C. or treating them with microwaves, any combinations of these methods also being possible. Optionally the fillers (F) preferably have a moisture content of less than 1% by weight, more preferably of less than 0.5% by weight.

The optionally used fillers (F) are preferably hydrophobic pyrogenic silica, titanium dioxide coated with silica and/or alumina and consisting of a rutile and/or anatase modification, carbon blacks and precipitated or ground calcium carbonate, more preferably hydrophobic pyrogenic silica and precipitated or ground calcium carbonate. If the compositions contain fillers (F), the amounts are preferably from 1 to 300 parts by weight, more preferably from 1 to 200 parts by weight, and in particular from 5 to 200 parts by weight, based in each case on 100 parts by weight of constituent (A). The compositions preferably contain fillers (F).

The optional adhesion promoters (G) may be any useful adhesion promoters which are also defined herein as being different from component (A), component (B), component (D) and component (E). Examples of the adhesion promoters (G) are organic compounds, silanes and organopolysiloxanes having functional groups such as those having epoxy, glycidoxypropyl, amino, amido, mercapto, carboxyl, anhydrido or methacryloyloxypropyl radicals, and tetraalkoxysilanes and siloxanes containing T or Q groups, which may optionally have alkoxy groups. If, however, another component such as, for example, component (A), (B), (D) or (E) already has functional groups, an addition of adhesion promoter (G) can be dispensed with. If the compositions contain adhesion promoters (G), the amounts are preferably from 0.1 to 50 parts by weight, more preferably from 0.5 to 20 parts by weight, and in particular from 1 to 10 parts by weight, based in each case on 100 parts by weight of constituent (A). The compositions preferably contain adhesion promoters (G).

All conventional organic solvents can be used as optionally used organic solvents (H). Examples of organic solvents (H) are organic solvents having a water content of less than 5% by weight, in particular of less than 1% by weight, for example alcohols such as methanol, ethanol, isopropanol, and 1,2-propanediol; ketones such as acetone or cyclohexanone; methyl ethyl ketoxime; esters such as butyl acetate, ethyl oleate, diethyl adipate, propylene carbonate, triethyl phosphate, glyceryl triacetate or dimethyl phthalate; ethers such as dipropylene glycol monomethyl ether, tetrahydrofuran or butoxyethoxyethyl acetate; amides such as N,N-dimethylacetamide or N,N-dimethylformamide; sulfoxides such as dimethyl sulfoxide; pyrrolidones such as N-methyl-2 pyrrolidone or N-octyl-2-pyrrolidone; hydrocarbons such as hexane, cyclohexane, octane, or dodecane; halogenated hydrocarbons such as trichloroethane or difluorotetrachloroethane; and aromatics such as alkylnaphthenes or alkylbenzenes. If the compositions contain organic solvents (H), the amounts are preferably from 0.1 to 10 parts by weight, more preferably from 0.2 to 5 parts by weight, and in particular from 0.5 to 2 parts by weight, based in each case on 100 parts by weight of constituent (A). The compositions preferably contain organic solvent (H).

All moisture-curing-promoting condensation catalysts can be used as optionally used catalysts (K). Examples of condensation catalysts (K) are titanium compounds such as tetra-tert-butyl orthotitanate, titanium(IV) bis(ethylacetoacetato) diisobutoxide, titanium(IV) bis(ethylacetoacetato) dimethoxide, titanium(IV) bis(ethylacetoacetato)diethoxide, titanium(IV) bis(ethylacetoacetato)monoethoxide monomethoxide or titanium(IV) bis(ethylacetoacetato)diisopropoxide; and organic tin compounds such as di-n-butyltin dilaurate, di-n-butyltin diacetate, di-n-butyltin oxide, di-n-butyltin dineodecanoate, di-n-butyltin diacetylacetonate, di-n-butyltin maleate, di-n-octyltin diacetate, di-n-octyltin dilaurate, di-n-octyltin oxide, di-n-octyltin maleate, di-n-octyltin di(2-ethyl)hexanoate, di-n-octyltin neodecanoate, di-n-octyltin isodecanoate, and the partial hydrolysis products thereof and reaction products of these compounds or partial hydrolysis products with alkoxysilanes such as tetraethoxysilane, methyltriethoxysilane, methyltrimethoxysilane, propyltrimethoxysilane, 3-aminopropyltrimethoxysilane, 3-aminopropyltriethoxysilane, 2-aminoethyl-3-aminopropyltrimethoxysilane, 2-aminoethyl-3-aminopropyltrimethoxysilane or the condensates or cocondensates thereof; esters such as diisodecyl phthalate, di-n-octyl phthalate or diisodecyl phthalate, and mixtures or reaction products of titanium or tin compounds with phosphonic acids, phosphinic acids, phosphonic acid monoesters or phosphoric acid mono or diesters.

Furthermore, Lewis acids may also be used as condensation catalysts (K) such as titanium tetrachloride, silicon tetrachloride, silicon tetrafluoride, tert-butyltrichlorogermane, methyltrichlorosilane, dimethyldichlorosilane, boron trifluoride, and the adducts thereof with amines such as ethylamine, or with ethers such as diethyl ether, or with alcohols such as methanol, ethanol or isopropanol.

Furthermore, acids which contain B—OH, C(O)—OH, $S(O)_2$—OH and/or P(O)—OH groups, and HF, HCl, HBr or HI, can also be used as condensation catalysts (K). Examples of such acids are carboxylic acids, boric acid, boronic acids, borinic acids, sulfonic acids, phosphoric acids, phosphonic acids and phosphinic acids or the condensates or cocondensates thereof and the mono-, di- or triesters thereof with alcohols such as methanol, ethanol, isopropanol, n-propanol, tert-butanol, n-butanol, isobutanol, cyclohexanol, n-octyl alcohol, or lauryl alcohol, or with silanols such as trimethylsilanol, methyldimethoxysilanol or triethoxysilanol. Examples are n-octanoic acid, neodecanoic acid, oleic acid, monoethyl adipate, monoethyl malonate, monooctyl borate, diisodecyl borate, butylboronic acid, aminoethyl dibutyl borinate, octylsulfonic acid, dodecylbenzenesulfonic acid, octyl phosphate, dioctyl phosphate, octylphosphonic acid, monomethyl octylphosphonate, monotrimethylsilyl octylphosphonate, laurylphosphonic acid, vinylphosphonic acid and diisooctylphosphinic acid.

Furthermore, bases may also be used as condensation catalysts (K), as particular compounds which contain basic nitrogen or phosphorus. Examples are amines, hydrazines, amidines, guanidines, tetraalkylammonium hydroxide or tetraalkylphosphonium hydroxide. Examples are ethylamine, butylamine, laurylamine, diethylamine, di-n-butylamine, triethylamine, triisooctylamine, trioctylamine, methyldioctylamine, N-diethylamino-3-propylamine, 1-o-tolylbiguanides, tetramethylguanidine, butylguanidine, 1,5-diazabicyclo[4.3.0]nonene, 1,4-diazabicyclo[2.2.2]octane, 1,8-diazabicyclo[5.4.0]undec-7-ene, 1,5,7-triazabicyclo[4.4.0]dec-5-ene, methyl-1,5,7-triazabicyclo[4.4.0]dec-5-ene, tetrabutylammonium hydroxide and tetrabutylphosphonium hydroxide.

By synergistic combinations of abovementioned catalysts, the catalytic effect on the hydrolysis of Si—OR and/or on the condensation reaction of Si—OH with Si—OH or Si—OR can be greatly accelerated and hence the curing can be accelerated or the amount of catalyst can be reduced. Possible synergistic combinations are acids with bases, Lewis acids with bases and the abovementioned tin compounds with bases.

The optionally used catalysts (K) are preferably titanium compounds, organotin compounds, organic bases and organic bases with acids which contain C(O)—OH and/or P(O)—OH groups, organotin compounds being particularly preferred. The optionally used components (K) are commercially available products or can be prepared by methods customary in chemistry. The compositions preferably contain component (K) in amounts of from 0.0001 to 5 parts by weight, more preferably from 0.001 to 3 parts by weight, and in particular from 0.005 to 2 parts by weight, based in each case on 100 parts by weight of component (A). The compositions preferably contain catalyst (K).

The additives (L) optionally used in the compositions may be any additives suitable for use in organosilicon moisture-curing compositions. Examples of additives (L) are pigments, dyes, fragrances, antioxidants such as sterically hindered phenols, e.g. 2,6-di-tert-butyl-4-methylphenol (BHT), 1,6-hexamethylene bis[3-(3,5-di-tert-butyl-4-hydroxyphenyl) propionate], 2,2'-methylenebis(4-ethyl-6-tert-butylphenol), 6,6'-di-tert-butyl-2,2'-thiodi-p-cresol, (2,4,6-trioxo-1,3,5-triazine-1,3,5(2H,4H,6H)triyl)triethylene tris(3-(3,5-di-tert-butyl-4-hydroxyphenyl)propionate), 2,4,6-tris(3,5-di-tert-butyl-4-hydroxybenzyl)mesitylene, octadecyl-3-(3,5-di-tert-butyl-4-hydroxyphenyl)propionate, N,N'-hexane-1,6-diylbis [3-(3,5-di-tert-butyl-4-hydroxyphenylpropionamide], 1,3,5-tris(3,5-di-tert-butyl-4-hydroxybenzyl)-1,3,5-triazine-2,4,6 (1H,3H,5H)trione, 2-tert-butyl-6-(3-tert-butyl-2-hydroxy-5-methylbenzyl)-4-methylphenyl acrylate, $C_7$-$C_9$-branched alkyl [3-(3,5-di-tert-butyl-4-hydroxyphenyl)]propionate, thiodiethylene bis[3-(3,5-di-tert-butyl-4-hydroxyphenyl) propionate], pentaerythrityl tetrakis(3-(3,5-di-tert-butyl-4-hydroxyphenyl)propionate), diethyl [[3,5-bis(1,1-dimethylene)-4-hydroxyphenyl]methyl]phosphonate, 1,2-bis(3,5-di-tert-butyl-4-hydroxyhydrocinnamoyl)hydrazine, 4,4'-thiobis (2-tert-butyl-5-methylphenol), 1,3,5-tris(4-tert-butyl-3-hydroxy-2,6-dimethylbenzyl)-1,3,5-triazine-2,4,6(1H,3H, 5H)trione, polymer with sterically hindered phenol with the CAS number 68610-51-5 and 2,2'-methylenebis[6-(1-methylcyclohexyl)-p-cresol] or vitamin E, fungicides such as, for example, isothiazolinones, in particular n-2-octyl-2H-isothiazolin-3-one, n-butyl-1,2-benzisothiazolin-3-one or 4,5-dichloro-2-octyl-3(2H)-isothiazolin-3-one, 3-iodo-2-propynylbutyl carbamate, thiabendazole, carbendazime, 3-benzo[b]thien-2-yl-5,6-dihydro-1,4,2-oxathiazine 4-oxide, benzothiophene-2-cyclohexylcarboxamide-S,S-dioxide, and 2-thiazol-4-yl-1H-benzoimidazole, silver-containing carriers or nano-silver, triazole derivatives such as tebuconazole, or combinations of two or three active substances; compositions for influencing the electrical properties such as conductive carbon black; flame-retardant compositions; light stabilizers, e.g. benzotriazole derivatives such as 2-(5-chloro-2H-benzotriazol-2-yl)-6-(1,1-dimethylethyl)-4-methylphenol, 2,2'-(1,4-phenylene)bis(4H-3,1-benzoxazin-4-one), 2-(2H-benzotriazol-2-yl)-6-dodecyl-4-methylphenol, 2-(2H-benzotriazol-2-yl)-4,6-bis(1-methyl-1-phenylethyl) phenol, 2-(2'-hydroxy-3',5'-di-tert-amylphenyl)benzotriazole, 2-(2'-hydroxyphenyl)benzotriazole, 2-(2-hydroxy-3-sec-butyl-5-tert-butylphenyl)benzotriazole, 2,2'-methylenebis[6-(2H-benzotriazol-2-yl)-4-(1,1,3,3-tetramethylbutyl)phenol], 2-(2'-hydroxy-3',5'-di-tert-butylphenyl)-5-chlorobenzotriazole, 2-(2'-hydroxy-5'-methylphenyl)benzotriazole, 2-(2H-benzotriazol-2-yl)-4-methyl-6-dodecylphenol, 2,4-di-tert-butyl-6-(5-chlorobenzotriazol-2-yl)phenol, 2-(2H-benzotriazol-2-yl)-4, 6-di-tert-pentylphenol, formamidines such as ethyl 4-[[(methylphenylamino)methylene]amino]benzoate; and nanometal oxides, for example those of titanium, iron or zinc, the oxides of titanium being coated with silica and/or alumina; hydroxyphenyltriazines such as 2,4-bis(2,4-dimethylphenyl)-6-(2-hydroxy-4-isooctyloxyphenyl)-1,3,5-triazine, 2-[4-[(2-hydroxy-3-dodecyloxypropyl)oxy]-2 hydroxyphenyl]-4,6-bis(2,4-dimethylphenyl)-1,3,5-triazine, 2-[4,6-bis(2,4-dimethylphenyl)-1,3,5-triazin-2-yl]-5-{3-[(2-ethylhexyl)oxy]-2-hydroxypropoxy}phenol and isooctyl 2-[4-[4,6-bis[(1,1'-biphenyl)-4-yl]-1,3,5-triazin-2-yl]-3-hydroxyphenoxy]propanoate; free radical scavengers, for example sterically hindered amines (HALS) such as bis(2,2, 6,6-tetramethyl-4-piperidyl) sebacate, 1,3,5-triazine-2,4,6-triamine-N,N'-[1,2-ethanediylbis[[[4,6-bis[butyl(1,2,2,6,6-pentamethyl-4-piperidinyl)amino]-1,3,5-triazin-2-yl] imino]-3,1 propanediyl]], 2,2,6,6-tetramethyl-4-piperidinyl esters of $C_{12-21}$- and $C_{18}$-unsaturated fatty acids, polymeric HALS with the CAS No. 65447-77-0, 3-dodecyl-1-(2,2,6,6-tetramethyl-4-piperidinyl)-2,5-pyrrolidinedione, poly[(6-morpholino-s-triazine-2,4-diyl][2,2,6,6-tetramethyl-4-piperidyl)imino]-hexamethylene [(2,2,6,6-tetramethyl-4-piperidyl)imino], poly[[6-[(1,1,3,3-tetramethylbutyl) amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]], methyl-1,2,2,6,6-pentamethyl-4-piperidyl sebacate, bis(1,2,2,6,6-pentamethyl-4-piperidyl) sebacate, bis(2,2,6,6-tetramethyl-4 piperidyl) sebacate, N,N-diphenyl-p-phenylenediamine, 1 ethyl-2,2,6,6-tetramethyl-4-piperidyl succinate polyester, bis(2,2,6,6-tetramethyl-1-octyloxy-4-piperidyl) sebacate and polymeric HALS with the CAS number 192268-64-7; compositions for increasing the skin formation time such as silanes having an SiC-bonded mercaptoalkyl radical; cell-producing compositions, e.g. azodicarbonamide; heat stabilizers such as triisodecyl phosphite, tris(nonylphenyl) phosphite or diisodecyl phenyl phosphite; so-called scavengers such as Si—N-containing silazanes or silylamides; and thixotropic agents, for example, amide waxes or hydrogenated castor oil.

If the compositions contain additives (L), they are preferably pigments, dyes, antioxidants, fungicides, free radical scavengers and thixotropic agents, more preferably pigments, fungicides, free radical scavengers and thixotropic agents. If the compositions contain additives (L), the amounts are preferably from 0.01 to 20 parts by weight, more preferably from 0.05 to 10 parts by weight, and in particular from 0.1 to 5 parts by weight, based in each case on 100 parts by weight of constituent (A). The compositions preferably contain additives (L).

The compositions are more preferably those which can be prepared using
(A) compounds of the formula (I),
(B) organosilicon compounds containing basic nitrogen and containing units of the formula (VI),
(C) oxaldianilides of the formula (II),
(D) crosslinking agents,
(E) optionally, plasticizers,
(F) optionally, fillers,
(G) optionally, adhesion promoters,
(H) optionally, organic solvents,
(K) optionally, catalysts and
(L) optionally, additives.

In particular, the compositions contain no further constituents apart from the components (A) to (L), and are preferably viscous to pasty materials.

For the preparation of the compositions, all constituents can be mixed with one another in any sequence. This mixing can be effected at room temperature and atmospheric pressure, i.e. from about 900 to 1100 hPa. If desired, however, this mixing can also be effected at higher temperatures, for example in the temperature range from 35 to 135° C. Furthermore, it is possible to effect mixing intermittently or continuously under reduced pressure such as, for example, at from 30 to 500 hPa absolute pressure, in order to remove volatile compounds and/or air.

For better distribution, in particular where small amounts are added or in the case of solid substances, it may be advantageous to dilute or to dissolve individual components with a liquid such as, for example, crosslinking agent (D), plasticizer (E) or organic solvents (H). Particularly in the case of solid substances, it is, however, also possible to disperse them in a liquid, optionally with addition of suitable fillers and milling auxiliaries such as barium sulfate, pyrogenically prepared silica or calcium carbonate. Suitable liquids are all liquids in which the solid to be dispersed does not dissolve or does not dissolve completely. Examples of such liquids are the components (D), (E) and organic solvents (H). The dispersion can be prepared by means of suitable apparatuses such as a ball mill and/or a three-roll mill. The mean particle size of the solid to be dispersed is preferably in the range from 0.1 to 100 µm, more preferably in the range from 0.5 to 50 µm, in the dispersion.

If desired, individual components, in particular liquid substances, can be used in the preparation of the compositions in encapsulated form, which however is not preferred. The liquid substance is then surrounded by a solid material and release takes place by diffusion and/or contact with atmospheric humidity and/or contact with oxygen and/or by the action of electromagnetic waves such as UV radiation or microwaves, or by sound waves such as ultrasound.

Particularly in the case of liquid substances, however, it is also possible to add these in a form bound to active surfaces, which is also not preferred. Such carrier materials can be substances having a BET surface area of more than 10 m$^2$/g such as pyrogenic silica having a hydrophilic or hydrophobic surface, precipitated silica, precipitated calcium carbonate having an uncoated or coated (e.g. stearic acid) surface, carbon blacks such as furnace black and acetylene black, and silicon-aluminum mixed oxides having a large BET surface area; fibrous fillers such as asbestos, and plastic fibers; substances which can incorporate small molecules in pores and/or intermediate layers such as aluminas, aluminum silicates, diatomaceous earth, calcium silicate, zirconium silicate, zeolites or polymeric carriers which are prepared by copolymerization of monomers such as acrylates or styrene and suitable crosslinking agents such as divinylbenzene or aliphatic dienes, by suitable preparation processes such as suspension polymerization, so that micropores form, or are prepared by addition of inert material such as isoparaffins, so that macropores form.

The mixing of the individual constituents is preferably effected with very substantial exclusion of water. The individual constituents of the compositions may be in each case one type of such a constituent as well as a mixture of at least two different types of such constituents.

For the crosslinking of the compositions, the usual water content of the air is sufficient. The crosslinking of the compositions preferably takes place at room temperature. It can, if desired, also be carried out at temperatures higher or lower than room temperature, for example at from 5° to 15° C. or at from 30° to 50° C., and/or by means of concentrations of water which exceed the normal water content of the air. Preferably, the crosslinking is carried out at a pressure of from 100 to 1100 hPa, in particular at atmospheric pressure, i.e. from about 900 to 1100 hPa.

The present invention furthermore relates to moldings produced by crosslinking the compositions.

The compositions can be used for all intended purposes for which materials storable in the absence of water and crosslinking on admission of water at room temperature to give elastomers can be used. The compositions are therefore eminently suitable, for example, as sealing compounds for joints, including perpendicular joints, and for similar spaces having, for example, an internal width of from 10 to 40 mm, for example of buildings, land vehicles, water vehicles and aircraft, or as adhesives or cementing compounds, for example in window construction, or in the production of glass cabinets, and, for example, for the production of protective coverings or nonslip coatings, or for elastomeric moldings and for the insulation of electrical or electronic apparatuses.

The compositions have the advantage that they are easy to prepare, and they and the moldings produced therefrom have the additional advantage that they are UV-stable and do not become discolored or do so only to an insignificant extent. Furthermore, the compositions have the advantages that they do not yellow during storage and hence high-quality transparent products can also be produced, and that they are distinguished by a very long shelf-life.

In the examples described below, all viscosity data relate to a temperature of 25° C. Unless stated otherwise, the examples below are carried out at atmospheric pressure, i.e. at about 1000 hPa, and at room temperature, i.e. at about 23° C., or at a temperature which results on combining the reactants at room temperature without additional heating or cooling, and at a relative humidity of about 50%. Furthermore, all data of parts and percentages are based on weight, unless stated otherwise. Below, the term "standard climate" is intended to comprise 23° C.±2° C. and 50%±5% relative humidity at atmospheric pressure (from 860 hPa to 1060 hPa) and an air speed of less than or equal to 1 m/s.

Test 1:
Determination of the Skin Formation Time

For determining the skin formation time, the crosslinkable materials obtained in the examples are applied in a 2 mm thick layer to PE film and stored in a standard climate. During the curing, the formation of a skin is tested every 5 min. For this purpose, a dry and grease-free finger is placed carefully on the surface of the sample and pulled upward. If sample remains adherent to the finger, a skin has not yet formed. If sample no longer adheres to the finger, a skin has formed and the time is noted.

Test 2:
Assessment of the Yellow Coloration

For assessing the yellow coloration, the crosslinkable materials obtained in the examples are applied in a 6 mm thick layer to PE film and stored in a standard climate. After storage for seven days in a room with daylight through window glass, the vulcanizate is removed from the PE film and the b value is determined via white according to the CIE-LAB system using a colorimeter from Datacolor International, USA, of the Microflash type. The b value is the average value of 5 measuring points and is rounded up to the next integer. b=0 means no color, b greater than zero means a yellow color; the greater the b value, the more yellow the vulcanizate appears. A b value up to 5 is scarcely detectable with the eye and is therefore positive.

Test 3:
Assessment of the Yellow Coloration After UV Storage

For assessing the yellow coloration after UV storage, the crosslinkable materials obtained in the examples are applied in a 6 mm thick layer to PE film and stored in a standard climate. After storage for seven days in a room with daylight through window glass, the vulcanizate obtained is exposed for 7 days to radiation in the range from 290 to 800 nm with a luminous intensity of (550±75) W/m$^2$. The radiation is produced by a xenon arc lamp with a suitable filter so that the spectral distribution meets the requirements of ISO 4892-2 (method A). Thereafter, the vulcanizate is removed from the PE film and the b value is determined via white as described above. The b value is the average value of 5 measuring points and is rounded up to the next integer. b=0 means no color, b greater than zero means a yellow color; the greater the b value, the more yellow the vulcanizate appears. A b value up to 5 is scarcely detectable with the eye and is therefore positive.

Test 4:

Assessment of the Adhesion

The substrates to be tested are cleaned to remove adhering dirt and are degreased with a suitable solvent. For determining the adhesion, the crosslinkable materials obtained in the examples are applied in a 2 mm thick layer to the substrates to be tested and are stored for seven days in a standard climate. For testing the adhesion, a piece of vulcanizate about 1 cm long is scraped off the substrate and then pulled in the direction of the still adhering rubber until failure occurs. If the rubber itself tears, the adhesion is satisfactory and is rated with 1. If the rubber can be pulled off the substrate without a residue, the adhesion is poor and is rated with 5.

EXAMPLE 1

Preparation of Polymer 1

970 g of a poly(propylene glycol) diol having a low monol content and an average molecular weight of 18,000 g/mol, an OH number of 7.0 mg KOH/g, a molar mass distribution Mw/Mn of 1.1 and a viscosity of 23,000 mPa·s (commercially available from Bayer MaterialScience AG, Germany, under the name of "Acclaim Polyol 18200N"), 30 g of 3-isocyanatopropyltrimethoxysilane and 0.1 g of bismuth octanoate were reacted for 1 hour at 90° C. and 1 g of methanol was then added in order to trap isocyanate radicals. The reaction product was cooled to room temperature and was stored in the absence of moisture. A clear, colorless polymer having a viscosity of 35,000 mPa·s was obtained.

400 g of the polymer 1 thus prepared, 250 g of a polypropylene glycol monohydroxymonobutyl ether having a viscosity of 240 mPa·s at 50° C. and a water content, determined by means of Karl-Fischer titration, of 120 ppm, 6.4 g of N-(2-ethoxyphenyl)-N'-(4-isododecylphenyl)ethylenediamide dissolved in 1.6 g of xylene (commercially available under the name SANDUVOR® 3206 from Clariant, Germany) and 3 g of a HALS mixture consisting of about 25% of methyl 1,2,2,6,6-pentamethyl-4-piperidyl sebacate and about 75% of bis(1,2,2,6,6-pentamethyl-4-piperidyl) sebacate (commercially available under the name TINUVIN® 292 from Bodo Möller Chemie, Germany) are mixed with one another in a planetary mixer and stirred for 5 minutes at about 100 mbar absolute pressure. Thereafter, 5 g of O-methyl N-((dimethoxy)methylsilylmethyl)carbamate (commercially available under the name GENIOSIL® XL 65 from Wacker Chemie AG, D-Munich) and 10 g of vinyltrimethoxysilane (commercially available under the name GENIOSIL® XL 10 from Wacker Chemie AG, D-Munich) are added and stirring is effected for a further 5 minutes. Thereafter, the batch is completed by homogeneously mixing in 80 g of hydrophobic pyrogenic silica having a specific surface area of 200 m²/g (commercially available under the name HDK® H18 from Wacker Chemie AG, D-Munich), 100 g of polypropylene glycol monohydroxymonobutyl ether having a viscosity of 240 mPa·s at 50° C. and a water content, determined by means of Karl-Fischer titration, of 120 ppm, 9.0 g of 3-aminopropyltrimethoxysilane (commercially available under the name GENIOSIL® GF 96 from Wacker Chemie AG, D-Munich) and 2.5 g of dioctyltin dilaurate (commercially available under the name WACKER® catalyst C39 from Wacker Chemie AG, D-Munich). Finally, the mixture is stirred for 5 minutes at about 100 mbar absolute pressure, introduced air-tight into a 310 ml PE cartridge and stored.

After storage for one day at room temperature, tests 1 to 3 are carried out. The results are shown in Table 1.

EXAMPLE 2

The procedure described in Example 1 was repeated, with the modification that, in addition to the 3 g of an HALS mixture consisting of about 25% of methyl 1,2,2,6,6-pentamethyl-4-piperidyl sebacate and about 75% of bis(1,2,2,6,6-pentamethyl-4-piperidyl) sebacate, 3 g of a polymeric HALS having the CAS No. 192268-64-7 (commercially available under the name CHIMASSORB® 2020 from Bodo Möller Chemie, Germany), dissolved in 5 g of dipropylene glycol dimethyl ether, were also used.

After storage for one day at room temperature, tests 1 to 3 are carried out. The results are shown in Table 1.

EXAMPLE 3

The procedure described in Example 1 was repeated, with the modification that, instead of 6.4 g of N-(2-ethoxyphenyl)-N-(4-isododecylphenyl)ethylenediamide dissolved in 1.6 g of xylene, 6.0 g of N-(2-ethoxyphenyl)-N'-(2-ethylphenyl)ethylenediamide (commercially available under the name TINUVIN® 312 from Bodo Möller Chemie, Germany) dissolved in 24 g of 1-methyl-2-pyrrolidone were used.

After storage for one day at room temperature, tests 1 to 3 are carried out. The results are shown in Table 1.

EXAMPLE 4

The procedure described in Example 1 was repeated, with the modification that, instead of 6.4 g of N-(2-ethoxyphenyl)-N-(4-isododecylphenyl)ethylenediamide dissolved in 1.6 g of xylene, a dispersion of 6.0 g of N-(2-ethoxyphenyl)-N-(2-ethylphenyl)ethylenediamide (commercially available under the name TINUVIN® 312 from Bodo Möller Chemie, Germany) in 24 g of polypropylene glycol monohydroxymonobutyl ether having a viscosity of 240 mPa·s at 50° C. and a water content, determined by means of Karl-Fischer titration, of 120 ppm, which is dispersed for 10 min in a mixer from Hauschild from Hamm in Germany of the type AM 501 at 2200 RPM with 30 g of stainless steel balls having a diameter of 2.0 mm, was used, the dispersion having a particle fineness of less than 30 μm.

After storage for one day at room temperature, tests 1 to 3 are carried out. The results are shown in Table 1.

COMPARATIVE EXAMPLE C1

The procedure described in Example 1 was repeated, with the modification that, instead of 6.4 g of N-(2-ethoxyphenyl)-N-(4-isododecylphenyl)ethylenediamide dissolved in 1.6 g of xylene, 6.0 g of a liquid UV absorber of the hydroxyphenyltriazine type having the CAS No. 153519-44-9 (commercially available under the name TINUVIN® 400 from Bodo Möller Chemie, Germany) were used.

After storage for one day at room temperature, tests 1 to 3 are carried out. The results are shown in Table 1.

COMPARATIVE EXAMPLE C2

The procedure described in Example 1 was repeated, with the modification that, instead of 6.4 g of N-(2-ethoxyphenyl)-N-(4-isododecylphenyl)ethylenediamide dissolved in 1.6 g of xylene, 6.0 g of a UV absorber of the benzotriazole type having the EC number 401-680-5 (commercially available under the name TINUVIN® 571 from Bodo Möller Chemie, Germany) were used.

After storage for one day at room temperature, tests 1 to 3 are carried out. The results are shown in Table 1.

COMPARATIVE EXAMPLE C3

The procedure described in Example 1 was repeated, with the modification that, instead of 6.4 g of N-(2-ethoxyphenyl)-N'-(4-isododecylphenyl)ethylenediamide dissolved in 1.6 g of xylene, 6.0 g of 2-(ethylhexyl)-2-cyano-3,3-diphenyl acrylate of the cyanoacrylate type having the CAS number 6197-30-4 (commercially available under the name UVINUL® 3039C from BASF AG, Germany) were used.

After storage for one day at room temperature, tests 1 to 3 are carried out. The results are shown in Table 1.

TABLE 1

| Examples | Test 1 [min] (skin formation time) | Test 2 (b value) | Test 3 (b value after UV storage) |
|---|---|---|---|
| 1 | 45 | 4 | 3 |
| 2 | 45 | 5 | 5 |
| 3 | 45 | 2 | 3 |
| 4 | 30 | 3 | 3 |
| C1 | 30 | 6 | 7 |
| C2 | 45 | 7 | 10 |
| C3 | 45 | 13 | not measurable since vulcanizate is too tacky |

The results of Table 1 show that, with oxaldianilides of the formula (II), it is possible to prepare curable materials which have no visible yellowing.

EXAMPLE 5

225 g of polymer 1, whose preparation is described above under Example 1, 20 g of a powder having a particle size of less than 32 μm and a water content of less than 0.01 g/l, based on hydrogenated castor oil, 6.4 g of N-(2-ethoxyphenyl)-N'-(4-isododecylphenyl)ethylenediamide dissolved in 1.6 g of xylene (commercially available under the name SANDUVOR® 3206 from Clariant, Germany), 3 g of an HALS mixture consisting of about 25% of methyl 1,2,2,6,6-pentamethyl-4-piperidyl sebacate and about 75% of bis(1,2,2,6,6-pentamethyl-4-piperidyl) sebacate (commercially available under the name TINUVIN® 292 from Bodo Möller Chemie, Germany), 105 g of a ground calcium carbonate treated with stearic acid and having a median particle diameter (D50%) of 5.7 μm (commercially available under the name OMYA BLR3 from OMYA GmbH, Germany) and 105 g of a precipitated calcium carbonate treated with stearic acid and having a median particle diameter (D50%) of 80 nm (commercially available under the name Hakuenka CCR from Shiraishi Kogyo Kaisha, Ltd., Japan) are mixed with one another in a planetary mixer and stirred for 15 minutes at about 100 mbar absolute pressure and such a high speed that a product temperature of about 50° C. is reached. Thereafter, 360 g of polypropylene glycol monohydroxymonobutyl ether having a viscosity of 240 mPa·s at 50° C. and a water content, determined by means of Karl-Fischer titration, of 120 ppm, 5 g of (methacryloyloxymethyl)-methyldimethoxysilane (commercially available under the name GENIOSIL® XL 32 from Wacker Chemie AG, D-Munich) and 12.5 g of vinyltrimethoxysilane (commercially available under the name GENIOSIL® XL 10 from Wacker Chemie AG, D-Munich) are added and stirring is effected for a further 5 minutes. Thereafter, the batch is completed by homogeneously mixing in 42 g of hydrophobic pyrogenic silica having a specific surface area of 200 $m^2$/g (commercially available under the name HDK® H18 from Wacker Chemie AG, D Munich), 5.0 g of 3-aminopropyltrimethoxysilane (commercially available under the name GENIOSIL® GF 96 from Wacker Chemie AG, D Munich) and 2.5 g of dioctyltin dilaurate (commercially available under the name WACKER® catalyst C39 from Wacker Chemie AG, D Munich). Finally, the mixture is stirred for 5 minutes at about 100 mbar absolute pressure, filled in an airtight manner and stored.

After storage for one day at room temperature, tests 1 and 4 are carried out. The results are shown in Table 2.

EXAMPLE 6

The procedure described in Example 5 was repeated, with the modification that 13.0 g of 3-aminopropyltrimethoxysilane were used instead of 5.0 g of 3-aminopropyltrimethoxysilane.

After storage for one day at room temperature, tests 1 and 4 are carried out. The results are shown in Table 2.

EXAMPLE 7

The procedure described in Example 6 was repeated, with the modification that 5.0 g of 3-glycidyloxypropyltrimethoxysilane were also used in addition to the 3-aminopropyltrimethoxysilane.

After storage for one day at room temperature, tests 1 and 4 are carried out. The results are shown in Table 2.

EXAMPLE 8

The procedure described in Example 5 was repeated, with the modification that 5.0 g of N-(2-aminoethyl)-3-aminopropyltrimethoxysilane (commercially available under the name GENIOSIL® GF 91 from Wacker Chemie AG, D-Munich) were used instead of 5.0 g of 3-aminopropyltrimethoxysilane.

After storage for one day at room temperature, tests 1 and 4 are carried out. The results are shown in Table 2.

EXAMPLE 9

The procedure described in Example 8 was repeated, with the modification that 10.0 g of N-(2-aminoethyl)-3-aminopropyltrimethoxysilane were used instead of 5.0 g of 3-aminopropyltrimethoxysilane.

After storage for one day at room temperature, tests 1 and 4 are carried out. The results are shown in Table 2.

COMPARATIVE EXAMPLE C4

The procedure described in Example 5 was repeated, with the modification that 5.0 g of 3-(dibutylamino)-1-propylamine (commercially available from Sigma-Aldrich Corporation, USA) were used instead of 5.0 g of 3-aminopropyltrimethoxysilane.

After storage for one day at room temperature, tests 1 and 4 are carried out. The results are shown in Table 2.

COMPARATIVE EXAMPLE C5

The procedure described in Example 5 was repeated, with the modification that 1.0 g of 1,5,7-triazabicyclo[4.4.0]dec-5-ene (commercially available under the name TBD from Sigma-Aldrich Corporation, USA) dissolved in 1.0 g of methanol p.A. was used instead of 3-aminopropyltrimethoxysilane.

After storage for one day at room temperature, tests 1 and 4 are carried out. The results are shown in Table 2.

TABLE 2

| Example | Test 1 [min] | Test 4 (adhesion) | | | |
|---|---|---|---|---|---|
| | | Glass | Aluminum, anodized | Polyamide | Stainless steel |
| 5 | 60 | 1 | 1 | 1 | 1 |
| 6 | 30 | 1 | 1 | 1 | 1 |
| 7 | 25 | 1 | 1 | 1 | 1 |
| 8 | 70 | 1 | 1 | 1 | 1 |
| 9 | 60 | 1 | 1 | 1 | 1 |
| C4 | 100 | 1 | 5 | 5 | 5 |
| C5 | 250 | 2 | 5 | 5 | 5 |

The results in Table 2 show that an aminofunctional silane is necessary in order to achieve good adhesion and a sufficient curing rate.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A non-yellowing moisture-curable crosslinkable composition which is storage stable in the absence of water, comprising:

(A) at least one compound of the formula $$A\text{-}[(CR^1{}_2)_b\text{—}SiR_a(OR^2)_{3-a}]_x \qquad (I),$$

in which
A is an x-valent polyoxyalkylene radical bonded via —NR'—C(=O)—, —O—C(=O)—NH—, —C(=O)—O—, —O—C(=O)—O—, —O—, —O—CH$_2$—C(OH)H—CH$_2$—NR'—, —O—CH$_2$—C(OH)H—CH$_2$—S—, —O—CH$_2$—C(OH)H—CH$_2$—C(=O)— or —O—CH$_2$—C(OH)H—CH$_2$—O— to the group [(CR$^1{}_2$)$_b$—SiR$_a$(OR$^2$)$_{3-a}$], in which R' are identical or different and are hydrogen or a monovalent, optionally substituted hydrocarbon radical,
R each are identical or different monovalent, optionally substituted hydrocarbon radicals,
R$^1$ each are identical or different and are hydrogen or a monovalent, optionally substituted hydrocarbon radical optionally linked to the carbon atom via nitrogen, phosphorus, oxygen, sulfur or a carbonyl group,
R$^2$ each are identical or different and are hydrogen or a monovalent, optionally substituted hydrocarbon radical,
x is an integer from 1 to 10,
a is 0, 1 or 2 and
b is an integer from 1 to 10, (B) one or more organosilicon compounds containing basic nitrogen and containing units of the formula $$R_k{}^{12}D_l Si(OR^{13})_m O_{(4-k-l-m)/2} \qquad (VI)$$

in which R$^{12}$ each are identical or different monovalent, optionally substituted SiC-bonded organic radicals free of basic nitrogen,
R$^{13}$ each are identical or different and are hydrogen or an optionally substituted hydrocarbon radical,
D are identical or different monovalent, Si-bonded radicals containing basic nitrogen,
k is 0, 1, 2 or 3,
l is 0, 1, 2, 3 or 4 and
m is 0, 1, 2 or 3,
with the proviso that the sum k+l+m is less than or equal to 4 and at least one radical D is present per molecule, and
(C) one or more oxaldianilides of the formula $$R^3\text{—}NH\text{—}C(=O)\text{—}C(=O)\text{—}NH\text{—}R^3 \qquad (II),$$

in which
R$^3$ each are identical or different monovalent, optionally substituted phenyl radicals.

2. The crosslinkable composition of claim 1, wherein radicals A are polyoxyalkylene radicals bonded via —O—C(=O)—NH—, to the group [(CR$^1{}_2$)$_b$—SiR$_a$(OR$^2$)$_{3-a}$], in which R' are identical or different and are hydrogen or a monovalent, optionally substituted hydrocarbon radical.

3. The crosslinkable composition of claim 1, wherein the radical A contains units of the formula $$NR'\text{—}C(=O)\text{—} \qquad (V)$$

in which
R' each are identical or different and are hydrogen or an optionally substituted, monovalent hydrocarbon radical, the units (V) bonded to the group [(CR$^1{}_2$)$_b$—SiR$_a$(OR$^2$)$_{3-a}$].

4. The crosslinkable composition of claim 1, wherein component (B) is present in an amount of from 0.001 to 10 parts by weight, based on 100 parts by weight of component (A).

5. The crosslinkable composition of claim 1, wherein radicals R$^3$ are phenyl, alkylphenyl, alkoxyphenyl or alkyl(alkoxy)phenyl radicals, the alkyl and alkoxy groups present in any position on the phenyl ring.

6. The crosslinkable composition of claim 1, wherein component (C) is present in an amount of from 0.01 to 10 parts by weight, based on 100 parts by weight of component (A).

7. The crosslinkable composition of claim 1, wherein the compositions comprise:

(A) compounds of the formula (I),
(B) organosilicon compounds containing basic nitrogen and containing units of the formula (VI), $$R_k{}^{12}D_l Si(OR^{13})_m O_{(4-k-l-m)/2} \qquad (VI)$$

in which
R$^{12}$ each are identical or different monovalent, optionally substituted SiC-bonded organic radicals free of basic nitrogen,
R$^{13}$ each are identical or different and are hydrogen or an optionally substituted hydrocarbon radical,
D are identical or different monovalent, Si-bonded radicals containing basic nitrogen,
k is 0, 1, 2 or 3,
l is 0, 1, 2, 3 or 4 and
m is 0, 1, 2 or 3,
with the proviso that the sum k+l+m is less than or equal to 4 and at least one radical D is present per molecule,
(C) oxaldianilides of the formula (II),
(D) crosslinking agents,
(E) optionally, plasticizers,
(F) optionally, fillers,
(G) optionally, adhesion promoters,
(H) optionally, organic solvents,
(K) optionally, catalysts and
(L) optionally, additives.

8. A molding produced by crosslinking the composition of claim 1.

* * * * *